United States Patent Office 3,191,620
Patented June 29, 1965

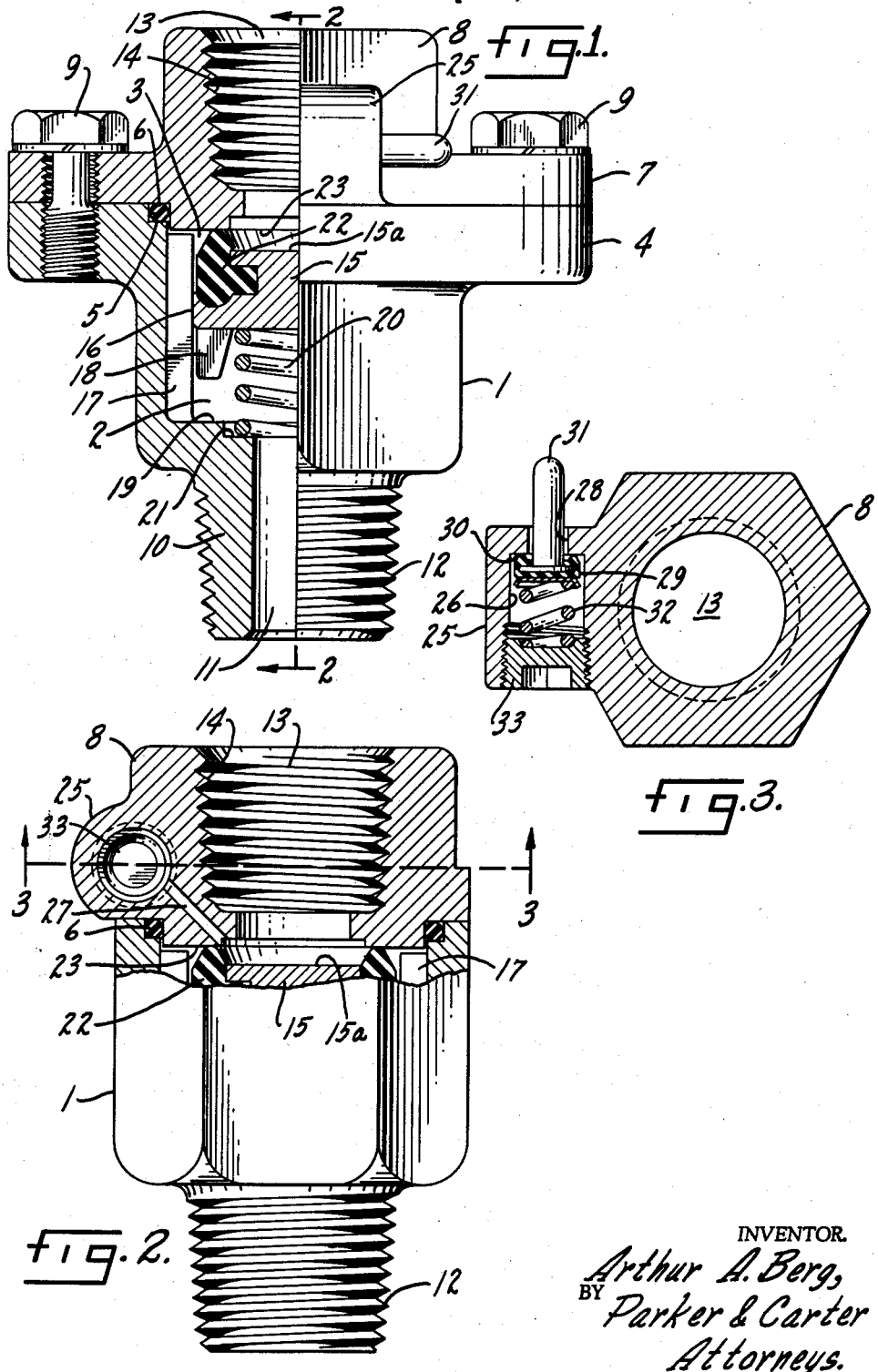

3,191,620
SAFETY CHECK VALVE
Arthur A. Berg, Lincolnwood, Ill., assignor, by mesne assignments, to Berg Mfg. & Sales Co., Des Plaines, Ill., a corporation of Illinois
Filed Sept. 4, 1962, Ser. No. 221,207
1 Claim. (Cl. 137—551)

This invention relates to valves and has particular relation to check valves.

One purpose of the invention is to provide a check valve assembly having means for testing the effectiveness thereof.

Another purpose is to provide a check valve assembly incorporating a mechanism for determining the effectiveness of the check valve.

Another purpose is to provide a check valve of maximum simplicity and economy in manufacture, and which shall have formed therewith a means for checking the effectiveness of the check valve.

Another purpose is to provide a check valve assembly having manual means associated therewith for determining the effectiveness of the check valve.

The invention has particular application to the fluid pressure systems employed in connection with the brake systems of vehicles, such as tractor-trailer combinations and the like. Check valves in such systems tend to become clogged with deleterious susbtances and thus to become less efficient. The difficulty of removing, checking, cleaning and re-installing such check valves is expensive and time consuming. In view of this, vehicle operating personnel have, on occasion, simply removed the valve parts from the housing, creating an unsafe condition. Regulatory authorities have, in concern for vehicle safety, required the periodic checking of all check valves in such systems and the provision of system-complicating and space-consuming downstream-positioned take-off lines or conduits has been suggested. It is accordingly one purpose of the invention to provide a unitary check valve assembly which shall include self-checking elements and which shall require no change in or addition to present lines or systems and which shall occupy virtually no space beyond that occupied by check valves currently employed.

Other purposes will appear from time to time during the course of the specification and the claim.

I illustrate my invention more or less diagrammatically in the accompanying drawings, wherein:

FIGURE 1 is a side elevation in partial cross-section;
FIGURE 2 is a view taken on the line 2—2 of FIGURE 1; and
FIGURE 3 is a view taken on the line 3—3 of FIGURE 2.

Like parts are indicated by like numerals throughout the specification and drawings.

Referring now to the drawings, and particularly to FIGURE 1 thereof, the valve of the invention is illustrated as including a housing part 1. The housing 1 has a chamber 2 therein. The chamber 2 is open at one end of the housing. The open end 3 of housing 1 is surrounded by an outwardly extending annular flange 4. The open end 3 of housing 1 is outwardly recessed, as indicated at 5, to receive a seal 6.

A mating annular flange 7 seats upon the flange 4 to position a passage and valve seat member 8 in the open end 3 of housing 1. Suitable fastening means, such as the fasteners 9, secure the part 8 to the part 1.

The housing part 1, at its end opposite from the open end 3, has an extension 10 through which the passage 11 extends for communication with chamber 2. The portion 10 may be inwardly threaded, as indicated at 12.

The portion 8 has a passage 13 formed therein for communication with the open end 3 of chamber 2, and the portion 8 may be inwardly threaded, as indicated at 14.

A shuttle valve member 15 is reciprocally mounted in chamber 2. The member 15, which may be formed in the general configuration of a piston, has an outer cylindrical wall 16 mounted for sliding engagement with a plurality of circumferentially spaced, inwardly extending vanes or guide rails 17. The rails 17 extend inwardly from the circumferential wall of the chamber 2. The end surface of member 15 opposed to passage 11 has a plurality of circumferentially spaced leg elements 18 formed thereon and extending axially therefrom toward the passage 11, the legs 18 being aligned with an annular end wall portion 19 of chamber 2 to preclude closure of passage 11 by the member 15. A spring 20 is positioned in chamber 2 and has one end thereof in contact with the said surface of member 15, within the legs 18, and the opposite end of spring 20 is in engagement with a recessed annular portion 21 in the wall 19 surrounding the inner open end of passage 11.

Secured to member 15 is a circular valve lip element 22 which may be formed of flexible material having, for example, the properties of rubber. The lip 22 extends axially of member 15 for seating upon an inner annular wall portion 23 of the member 8.

The member 8 has formed integrally therewith a projection 25 within which a chamber 26 is formed. A passage 27 places the passage 13 in communication with the chamber 26.

The chamber 26 has an outlet 28 formed therein and communicating with the area outside the member 8, or with atmosphere. A valve member 29 is mounted for reciprocation in chamber 26 and for seating upon an annular end wall surface 30 surrounding the outlet 28 to seal the same. The valve member 29 has an extension 31 extending through the outlet passage 28 to a point outwardly beyond the projection 25. A spring 32 is active against the opposite end of valve member 29 from the extension 31 to urge the valve 29 on its seat 30. An end closure member 33 is positioned in the opposite end of chamber 26 and the spring 32 is seated on member 33.

The use and operation of my invention are as follows:

The valve of the invention is arranged for positioning in a fluid pressure line. As the parts are shown on the drawings, the passage 13 would normally be the upstream side of or the inlet passage to the check valve. Fluid pressure entering the passage 13 impinges upon the surface 15a of check valve member 15 and urges the latter toward passage 11 against the action of spring 20. When this happens, the valve lip 22 is unseated from its seat 23 and fluid pressure is permitted to pass about the member 15 along and between the rails or vanes 17 into chamber 2 on the opposite side of valve 15 and thence outwardly through outlet passage 11. Fluid pressure flow in the opposite direction, however, is normally prevented by check valve member 15. Such fluid pressure would urge, in conjunction with the action of spring 20, the valve 15 toward the passage 13 and thus would urge the valve lip 22 onto its seat 23 to close passage 13 and to prevent passage of fluid pressure in such reverse direction through the valve housing 1.

Since the passage 27 is in communication with the inlet passage 13 and therefore with the inlet side of check valve 15, any of such reverse fluid pressure flow which may escape past the check valve 15 into the area within lip 22 is delivered to chamber 26. While passage 27 is illustrated as being angularly disposed and as communicating with the open end 3 of chamber 2 within the circumference of valve lip 22, it will be understood that valve passage 27 could be positioned at a number of points along inlet passage 13, so long as it was not closed off by any line secured to inlet 13.

When it is desired to check the effectiveness of the check valve 15, it is only necessary that the normal flow of fluid pressure into inlet 13 be shut off and that extension 31 be moved inwardly against the action of spring 32 to unseat valve 29 from its seat 30. If fluid pressure is escaping past check valve 15, it will be present in chamber 26 and will, upon actuation of extension 31, escape through outlet 28, thus indicating that the check valve 15 is inoperative and is not accomplishing its intended purpose.

While the extension 31 may be pressed inwardly by manual engagement thereof, it will be realized that any suitable handle or other means may be employed in moving the extension inwardly without departing from the nature and scope of the invention.

Whereas I have described and claimed a preferred embodiment of the invention, it will be understood that further modifications will suggest themselves to those skilled in the art upon a reading of the foregoing specification. Accordingly, the foregoing description should be taken as merely illustrative and not definitive, and the scope of the invention should be limited only by the following appended claim.

I claim:

A check valve assembly for use in and as a part of a fluid pressure line, including a first fitting formed and adapted for attachment to an upstream pressure line portion and a second fitting formed and adapted for attachment to a downstream pressure line portion, said fittings together forming a housing and defining a first chamber in said housing, an inlet passage in said first fitting communicating with one end of said first chamber, an outlet passage in said second fitting communicating with the opposite end of said first chamber, a check valve member reciprocal in said first chamber and yieldingly urged toward a position closing said inlet passage, said check valve member permitting a build up of pressure in said downstream pressure line portion, a second chamber formed in said first fitting and axially disposed in a plane offset from the axis of said first chamber, a branch passage in said first fitting placing said second chamber in communication with said inlet passage, an outlet in said first fitting axially aligned with said second chamber and communicating said second chamber with atmosphere, a second valve reciprocal in said second chamber and yieldingly urged against a seat to close said second chamber outlet, said second valve having an extension extending through said second chamber outlet and outwardly of said housing, said last-named outlet being larger than said extension to provide a clearance, said extension being operable to open said second valve and to communicate said first chamber with atmosphere through said branch passage, second chamber and second chamber outlet when said check valve member is out of said position.

References Cited by the Examiner
UNITED STATES PATENTS

| 1,606,426 | 11/26 | Justen | 137—596.2 |
| 2,736,338 | 2/56 | Britton | 137—543.21 |
| 2,800,142 | 7/57 | Champion | 137—543.19 |
| 2,809,659 | 10/57 | Gillespie et al. | 137—512 |

M. CARY NELSON, *Primary Examiner*.